US012583431B2

(12) United States Patent
     Palmisano

(10) Patent No.: US 12,583,431 B2
(45) Date of Patent: Mar. 24, 2026

(54) METHOD FOR MANAGING POWER CONSUMPTION OF A RAILWAY VEHICLE, AND RAILWAY VEHICLE WITH IMPROVED POWER CONSUMPTION MANAGEMENT

(71) Applicant: Bombardier Transportation GmbH, Berlin (DE)

(72) Inventor: Domenico Palmisano, Marcq en Baroeul (FR)

(73) Assignee: Bombardier Transportation GmbH, Berlin (DE)

( * ) Notice: Subject to any disclaimer, the term of this patent is extended or adjusted under 35 U.S.C. 154(b) by 124 days.

(21) Appl. No.: 18/273,810

(22) PCT Filed: Jan. 18, 2022

(86) PCT No.: PCT/EP2022/051008
     § 371 (c)(1),
     (2) Date: Jul. 24, 2023

(87) PCT Pub. No.: WO2022/157145
     PCT Pub. Date: Jul. 28, 2022

(65) Prior Publication Data
     US 2024/0034296 A1      Feb. 1, 2024

(30) Foreign Application Priority Data
     Jan. 25, 2021    (GB) ..................................... 2100956

(51) Int. Cl.
     *B60W 10/08*        (2006.01)
     *B60W 30/18*        (2012.01)
     *B61C 9/38*         (2006.01)

(52) U.S. Cl.
     CPC ...... *B60W 10/08* (2013.01); *B60W 30/18127* (2013.01); *B61C 9/38* (2013.01); *B60L 2200/26* (2013.01)

(58) Field of Classification Search
     CPC ............ B60W 10/08; B60W 30/18127; B60L 2200/26
     (Continued)

(56) References Cited

U.S. PATENT DOCUMENTS 4,698,761 A * 10/1987 Cooper .................. G05D 23/24
                                              701/19
8,013,469 B2    9/2011 Masselus
                   (Continued)

FOREIGN PATENT DOCUMENTS

CN        205365600 U     7/2016
CN        106585669 A     4/2017
                (Continued)

*Primary Examiner* — Kawing Chan
(74) *Attorney, Agent, or Firm* — The Webb Law Firm

(57)                ABSTRACT

A method for managing power consumption of a railway vehicle is provided. The power consumption of the railway vehicle is managed by a central control unit that receives information representing an amount of electrical traction power required for traction or generated by electrodynamic braking based on a traction demand set by the driver of the railway vehicle. The central control unit additionally receives information representing an amount of electrical auxiliary power demanded by auxiliary devices from control units of the respective auxiliary devices. The total available electrical power, which can be provided by the energy supply line for the railway vehicle, is determined. The central control unit prioritizes operation of the auxiliary devices based on the total available electrical power and the electrical traction power required for traction to selectively reduce consumption of electrical energy by all or selected auxiliary devices.

8 Claims, 6 Drawing Sheets

(58) Field of Classification Search
USPC .......................................................... 318/375
See application file for complete search history.

(56) References Cited

U.S. PATENT DOCUMENTS

| | | | |
|---|---|---|---|
| 8,136,454 | B2 | 3/2012 | Barbee et al. |
| 2002/0174798 | A1* | 11/2002 | Kumar .................... B60L 50/16 |
| | | | 105/50 |
| 2003/0187553 | A1 | 10/2003 | Dillen et al. |
| 2010/0019574 | A1* | 1/2010 | Baldassarre .............. H02J 9/06 |
| | | | 307/64 |
| 2010/0102625 | A1* | 4/2010 | Karimi .................... B60L 50/61 |
| | | | 307/9.1 |
| 2012/0245772 | A1* | 9/2012 | King ..................... B60W 10/30 |
| | | | 180/65.265 |
| 2014/0062371 | A1* | 3/2014 | Schultz ................. B60L 3/0061 |
| | | | 318/471 |
| 2016/0075350 | A1 | 3/2016 | Becker et al. |

| | | | | |
|---|---|---|---|---|
| 2017/0334264 | A1 | 11/2017 | Huaulme et al. | |
| 2019/0225113 | A1* | 7/2019 | Takeoka ................... B60M 3/00 | |
| 2020/0207377 | A1 | 7/2020 | Schuhholz et al. | |
| 2020/0317057 | A1 | 10/2020 | Salter et al. | |

FOREIGN PATENT DOCUMENTS

| | | | | |
|---|---|---|---|---|
| CN | 106945564 | A | | 7/2017 |
| CN | 109606111 | A | | 4/2019 |
| CN | 209938340 | U | | 1/2020 |
| DE | 4416107 | A1 | | 11/1995 |
| DE | 102011110639 | A1 | | 2/2013 |
| DE | 102017215352 | A1 | | 3/2019 |
| EP | 2476573 | A2 | | 7/2012 |
| EP | 2886386 | A1 | | 6/2015 |
| EP | 2476573 | A3 | | 11/2015 |
| JP | 2007336798 | A | | 12/2007 |
| JP | 2010040348 | A | * | 2/2010 |
| WO | 2019054875 | A1 | | 3/2019 |
| WO | 2020115427 | A1 | | 6/2020 |

\* cited by examiner

METHOD FOR MANAGING POWER CONSUMPTION OF A RAILWAY VEHICLE, AND RAILWAY VEHICLE WITH IMPROVED POWER CONSUMPTION MANAGEMENT

CROSS REFERENCE TO RELATED APPLICATIONS

This application is the United States national phase of International Patent Application No. PCT/EP2022/051008 filed Jan. 18, 2022, and claims priority to United Kingdom Patent Application No. 2100956.8 filed Jan. 25, 2021, the disclosure of which are hereby incorporated by reference in their entireties.

BACKGROUND OF THE INVENTION

Field of the Invention

The present invention pertains to a method for managing power consumption of a railway vehicle. Moreover, the present invention also pertains to a railway vehicle with improved power consumption management.

Description of Related Art

Railway vehicles are the backbone of public transport as they allow to transport a large number of passengers at reasonable costs. Railway vehicles are used for long distance transport such as between cities as well as for urban public transport such as metro and tram.

To improve the comfort of the passengers, modern railway vehicles include—in addition to devices needed for the operation of the vehicles—Heating, Ventilation, Air Conditioning (HVAC) and infotainment systems to name few. Devices needed for the operation of the train are, for example, traction motors, Air Generation and Treatment Unit (AGTU) for providing compressed air for the pneumatic braking system, electronic drives for doors, internal and external lights. All of these devices consume electrical energy.

In view of environmental concerns and the increasing number of electrical devices which consume energy, the economical use of electrical energy must also be addressed by modern railway vehicles.

Railway vehicles are supplied with electrical energy through overhead lines or by a third rail (or even a fourth rail), also known as live rail or electric rail. In the following, an overhead line and a third (fourth) rail are simply referred to as energy supply line. The voltage of the energy supply line sensed by the railway vehicle is not constant and changes depending on the distance of the railway vehicle from power substations, which provide energy to the energy supply line, and other vehicles which also draw energy from the energy supply line or which feed energy into the energy supply line during electrodynamic braking.

For illustration purposes, a simplified network model includes substations and railway vehicles. The substations can be considered as voltage generator. Railway vehicles can be considered as current generators with different sign depending from the mode of operation, i.e. consuming energy during acceleration/constant speed and producing energy during electrodynamic braking.

FIG. 5 illustrates an example of the voltage variation of an energy supply line. Substations which feed the electrical energy into the energy supply line are denoted by 611, 612, 613. At the location where the substations 611, 612, 613 feed the electrical energy into the energy supply line, the voltage of the energy supply line, simply referred to as Ucat, is fixed and correspond to the rated voltage, for example 750 V DC. Ucat stands for the voltage of the catenary, i.e. for an overhead line. Throughout the description, Ucat is used without being limited thereto. It is intended that other energy supply lines such as third rails are also encompassed.

When the railway vehicle driving in a segment between two adjacent substations 611 and 612 electrodynamically brakes, the harvested energy is fed back into the energy supply line and therefore the voltage Ucat raises in this segment. This is denoted by upwards pointing arrow 620. If another railway vehicle which for also drives in the segment between substations 611 and 612 accelerates, the other railway vehicle consumes energy resulting in a voltage drop of Ucat as indicated by the downwards pointing arrow 630. Since both railway vehicles are at different locations, indicated by the arrows 620 and 630, within the same segment the voltage Ucat varies between the substations 611 and 612. In a following segment between substations 612 and 613, only one accelerating railway vehicle moves and draws energy from the energy supply line resulting in a drop of Ucat. This is indicated by downward pointing arrow 640.

In addition to the energy consumption by the railway vehicles, energy is consumed by ohmic losses in the energy supply line. As the distance between the substations can be relatively large, for example up to 50 km for energy supply lines operated at 15 kV AC, the ohmic losses can be significant. Hence, even when a railway vehicle draws only a small amount of energy, there could be a significant voltage drop between two substations due to the ohmic losses. Furthermore, ohmic losses in the energy supply line increases when the railway vehicles draw a high current which is particularly relevant for energy supply lines operated at 750 V or 1500 V DC.

The allowed variation of the voltage provided by the energy supply line is defined in, IEC 60850. This standard defines allowable ranges for voltage variations for each rated voltage of the respective railway electrification system. Typical examples for railway electrification systems in Europe are 750 V DC, 1.5 kV DC, 3 kV DC, 15 kV AC and 25 kV AC.

FIG. 4 illustrates in greater detail the voltage variations and changes of the current drawn by a railway vehicle, such as a metro, at a given location p between two substations arranged at locations P1 and P3, respectively. At both substations, there is a railway station for the passengers to board the railway vehicle or to alight. An additional railway station is at location P2. Curve 510 denotes the velocity (dynamic) of the railway vehicle.

After leaving the railway station/substation at P1, the railway vehicle accelerates in section 511. Therefore, the voltage Ucat at the location of the railway vehicle drops with increasing distance of the railway vehicle from substation P1. Assume that a constant traction power is demanded by the railway vehicle, the railway vehicle draws more current Icat from the energy supply line to compensate for the drop of Ucat. Note that a negative Icat indicates that current flows from the energy supply line to the railway vehicle.

Even if the drawn current Icat would be kept constant, the voltage Ucat appearing at the position of the railway vehicle would gradually reduce with increasing distance of the railway vehicle from the substation. With increasing distance, the electrical resistance of the energy supply line increases. The voltage drop occurring along the energy supply line between the substation at P1 and the railway vehicle remote to this substation is proportional to the electrical resistance R and the current Icat flowing through the energy supply line. This voltage drop reduces the voltage available for the railway vehicle.

After reaching the desired travel speed, the railway vehicle is—in an ideal case—operated at constant speed in section 512. In this operational mode, the traction only draws power sufficient to keep the railway vehicle at constant speed. Other electric devices of the railway vehicle may also draw energy from the energy supply line. The drawn current Icat remains substantially constant but at a lower level than at the end of the accelerating section. However, Ucat further reduces with increasing distance from substation at location P1. When the total drawn power remains the same, the drawn current increases to compensate for the reducing power—hence, the current becomes more negative. This is not illustrated in section 512 which shows a simplified representation. In section 513, the railway vehicle electrodynamically brakes and thus regenerates energy which is supplied to the energy supply line. This is indicated by a "positive" current Icat and an increasing voltage Ucat. The "jumps" in Ucat are due to the sudden changes of the drawn current Icat which lead to a sudden change of the voltage drop along the energy supply line.

To bring the railway vehicle to complete stop, the railway vehicle is typically finally decelerated by a pneumatic brake. The railway vehicle therefore comes to a standstill at the railway station located at location P2. Since the railway station at P2 is at a distance from both substations at P1 and P3, the voltage Ucat provided by the energy supply line is lowest. When the railway vehicle accelerates again in section 515, the voltage Ucat further reduces as the absolute amount of the drawn current Icat increases. When the railway vehicle comes closer to the substation at P3, the voltage Ucat is more dominated by the voltage supplied by the substation at P3 and thus the voltage variations become smaller. At section 516, the railway vehicle is running at constant speed. The railway vehicle is electrodynamically decelerated at section 517 and finally decelerated using pneumatic brakes in section 518.

Thus, the current absorbed or regenerated by the railway vehicle and the distance between the railway vehicle and the respective nearest substation influence the voltage Ucat appearing at the energy supply line. The situation becomes even more complex if two or more railway vehicles are in the same segment between two substations so that decelerating and accelerating of the respective railway vehicles differently impact the voltage. Furthermore, the energy supply line may pose a limitation on the railway vehicles during breaking and regenerating energy as the energy supply line is only capable to absorb regenerated energy to a given degree. Excess energy generated during electrodynamically breaking may not be absorbed by the energy supply line. In this case the rheostatic breaking will dissipate the exceeded energy by ohmic losses.

There are some attempts to address the above described problems and to use the energy in an economic way.

For example, WO 2020/115427 A1 describes a control system for an AGTU which takes account of the state of the railway vehicle. The AGTU monitors the dynamic of the railway vehicle and provides a pressure vessel with compressed air when the railway vehicle electrodynamically brakes. The energy for operating the AGTU is taken from the energy regenerated by the electrodynamic brakes.

US 2017/0334264 A1 discloses a method for operating an HVAC of a railway vehicle. The control of the HVAC determines operational parameters for operating the HVAC according to environmental data such as temperature. The operational parameters are additionally modified by the current status of the railway vehicle, i.e. whether it accelerates or decelerates. The modified operational parameters are then actually used for operating the HVAC.

DE 44 16 107 A1 discloses a method for operating the HVAC of a railway vehicle. The HVAC is compulsorily operated during braking of the railway vehicle to use the regenerated energy even if cooling or heating would not be needed based on environmental data. The concept of DE 44 16 107 A1 is to "overheat" or to "overcool" as a precautionary measure so that the HVAC does not to be operated during acceleration of the railway vehicle.

EP 2 886 386 B1 describes a train-information management device which manages information on devices in a railway vehicle and which controls each of the devices. The information is used to control a HVAC.

US 2016/0075350 A1 also describes a system which operates a device which consumes electrical energy. The device is operated predominantly during braking phases of a railway vehicle.

Although the previous attempts may partly address the problems associated with the economic use of energy, there is need for further improvement.

SUMMARY OF THE INVENTION

The above problem is solved by a method as described herein. Furthermore, the problem is also solved by the railway vehicle as described herein. Further embodiments, modifications, aspects and advantages are disclosed in the dependent claims and the following description.

According to an embodiment, which can be combined with any other embodiment described herein, a method for managing power consumption of a railway vehicle receiving electrical energy from an energy supply line is provided. The railway vehicle has at least one traction motor, a plurality of auxiliary devices, each auxiliary device having a control unit and being an electrical power consumer, and a train control and monitoring system (TCMS) having a central control unit operationally connected with the control unit of each of the auxiliary devices. The method includes receiving, by the central control unit, information representing the amount of electrical traction power required for traction or generated by electrodynamic braking of the railway vehicle by the at least one traction motor based on a traction demand set by a driver of the railway vehicle; receiving, by the central control unit, information representing the amount of electrical auxiliary power demanded by auxiliary devices from the control units of the respective auxiliary devices; determining the total available electrical power for the railway vehicle which can be provided by the energy supply line; and prioritizing, by the central control unit, the operation of the auxiliary devices based on the total available electrical power and the electrical traction power required for traction to selectively reduce consumption of electrical energy by all or selected auxiliary devices if the sum of the electrical traction power required for traction and the electrical auxiliary power demanded by the auxiliary devices exceeds the total available electrical power.

Unlike previous attempts, the control of the energy consumption of the auxiliary devices is controlled by the central control unit of the TCMS taking into account the amount of the demanded electrical traction power and the total available electrical power which can be provided by the energy supply line. Depending thereon, the central control unit prioritizes operation of the respective auxiliary devices. For example, some of the auxiliary devices may be higher prioritized than other auxiliary devices depending on their relevance for the safe operation of the railway vehicle or depending on the current status of the vehicle. The auxiliary devices do not need to monitor the status of the railway vehicle as this is centrally managed.

The energy management for the auxiliary devices is centralised on an upper control level which is represented by the central control unit of the train control and monitoring system. The central control unit is connected with the control units of the auxiliary devices. This centralisation dispenses with the need for individual power management solutions provided by the supplier of the respective auxiliary device. Previously, the supplier of the respective auxiliary device, for example the HVAC, included means for monitoring the dynamic of the railway vehicle or for receiving corresponding information from the TCMS. The term "dynamic of the railway vehicle" intends to describes the current status of the railway vehicle including acceleration, deceleration, coasting, stop at a railway station and operation of doors, etc. Thus, each auxiliary device managed its power consumption on an individual basis without considering other auxiliary devices.

By centralising the energy management, the energy management of the railway vehicle can take into account not only the dynamic of the railway vehicle but also the status of the energy supply line to ensure that in case of energy demands higher than the available energy provided by the energy supply line, a prioritised use of the available energy is ensured. The energy consumption of the auxiliary devices can be selectively reduced when needed. Thus, there might be an auxiliary device which is rated to have a high priority and is therefore fully supplied with energy while another auxiliary device is set at a low priority and thus the supply of electrical energy to that auxiliary device is limited in case of energy shortages.

Operation of the auxiliary devices can therefore be deferred to periods where the demand for traction power is low or where energy is generated by the electrodynamic brakes. Moreover, since the central energy management also observes the total available electrical power for the railway vehicle, which may change depending on the distance of the railway vehicle from the nearest substations or the operation of other railway vehicles in the same segment fed by the nearest substations, prioritising of the operation of the auxiliary devices may also consider the variations of the total available electrical power. Therefore, energy consumption of the railway vehicle can be optimized.

The total available electrical power may be pre-set according to an embodiment, which can be combined with other embodiments described herein. For example, a value may be pre-set based on operating history. This value may be updated on a regular basis. Alternatively, the total available electrical power can be determined either by measurement and/or by obtaining relevant information from the wayside or substations.

According to an embodiment, which can be combined with other embodiments described herein, the information about the amount of electrical traction power is obtained by monitoring a position and/or the derivate in time of the position of a manipulator operated by the driver of the railway vehicle to accelerate and decelerate the railway vehicle.

The input of the driver, represented by the position of the manipulator which the driver operates to accelerate or decelerate the railway vehicle, can be used as main parameter for the energy management as the position of the manipulator indicates the required amount of traction power, which may be expressed by the required traction current. The traction usually consumes the majority of the electrical energy relative to the overall electrical consumption of the railway vehicle and is usually highest prioritised.

In addition to the position of the manipulator, the derivative in time of the position of the manipulator allows forecasting of higher or lower energy demands, typically a higher or lower traction current demand, for the traction. For example, if the driver pushes the manipulator further to demand higher acceleration, this might be an indication that the train is not accelerating fast enough and that the driver may request, through pushing of the manipulator, even more electrical energy for the traction. If the overall available energy provided by the energy supply line is limited, the forecast may allow to reduce energy supply to selected auxiliary devices so that most of the available energy can be provided to the traction. The overall available energy provided by the energy supply line may be limited due to ohmic losses in the energy supply line when the railway vehicle is distant to a power substation.

On the other hand, the derivative in time of the position of the manipulator may also allow forecasting of energy supply when the railway vehicle electrodynamically brakes.

In addition to or in alternative to monitoring the position of the manipulator, the traction current can be monitored to provide the required information.

Irrespective of whether the position of the manipulator is monitored or the traction current is measured, the information representing the amount of electrical traction power required for traction of the railway vehicle can be easily obtained. This information may also include information on the total available electrical power. If, for example, the voltage supplied by the energy supply line is reduced due to another train also drawing energy from the energy supply line, the driver may be required to push the manipulator more to accelerated the railway vehicle with the desired acceleration. Thus, the "stronger" push of the manipulator represents a higher traction current to compensate for the reduced voltage of the energy supply line.

Thus, by comparing the intended acceleration and the drawn traction current needed to accelerate the railway with the intended acceleration, information on the "status" of the energy supply line can be derived. This status may be linked with the total available electrical power for the railway vehicle.

According to an embodiment, which can be combined with other embodiments described herein, prioritizing operation of the auxiliary devices may include sending instructions to the control unit of the respective auxiliary device for load shedding.

When an auxiliary device is set at low priority, instructions or commands may be sent by the central control unit of the train control and monitoring system to the control unit of that auxiliary device to reduce its power consumption.

According to an embodiment, which can be combined with other embodiments described herein, the railway vehicle further comprises an auxiliary power supply for supplying at least one of the auxiliary devices with electrical energy. The auxiliary power supply includes a control unit operationally connected with the central control unit of the train control and monitoring system (TCMS). Prioritizing operation of the auxiliary devices may include sending instructions to the control unit of the auxiliary power supply to reduce the power output of the auxiliary power supply to the at least one auxiliary device.

Reducing the power consumption of an auxiliary device may also be possible by reducing the power supply to this auxiliary device. Typically, the electrical supply system of the railway vehicle includes a traction power supply for the traction and one or more auxiliary power supplies for the auxiliary devices. The main reason for the different power supplies is that the traction power supply directly drives the traction motor and is therefore controlled depending in the intended dynamic (acceleration, braking, etc) of the railway vehicle. Both the traction power supply and the auxiliary power supply (or supplies) coupled with the intermediate circuit of the electrical supply system of the railway vehicle. Furthermore, separating the power supply devices allows to tailor the respective power supplies to the energy consumers.

The central control unit of the train control and monitoring system can therefore selectively reduce operation of the auxiliary power supply to limit the energy drawn from the intermediate circuit so that more or most of the energy fed into the intermediate circuit is available for the traction power supply.

According to an embodiment, which can be combined with other embodiments described herein, determining the total available electrical power comprises receiving information, representing the total available electrical power, from the wayside by the train control and monitoring system.

The total available electrical power may change during operation of the railway vehicle. The total available electrical power is influenced by many parameters such as the distance of the railway vehicle to the nearest substation feeding electrical energy to the energy supply line and the presence of other railway vehicles in the same segment of the energy supply line fed by that substation. Information from the wayside may be obtained through a balise or other types of transponders. Furthermore, the information can also be provided by radio communication such as GSM-R or TETRA. Providing the central control unit of the train control and monitoring system with information from the wayside allows to take latest additional information about the energy supply line into account.

According to an embodiment, which can be combined with other embodiments described herein, determining the total available electrical power comprises determining the voltage supplied by the supply line and/or determining the current drawn by the railway vehicle from the supply line. Additionally or alternatively, the current drawn by the railway vehicle and/or the voltage of the energy supply line, as appearing at the location of the railway vehicle, can be monitored and included in the determination of the total available power. Typically, the voltage of the energy supply line is monitored as this parameter is easier to obtain than a measurement of the current. Furthermore, if the railway vehicle is provided with the energy meter, a direct measurement of the currently drawn power would also be possible.

According to an embodiment, which can be combined with other embodiments described herein, determining the total available electrical power comprises determining a maximum current limitation pre-set for the railway vehicle. The maximum current limitation may be a static value or maybe a dynamically changing value. The maximum current limitation is for protecting the electrical equipment of the railway vehicle from overload. Situations may arise where the energy supply line is capable of providing more energy than rated, for example when the railway vehicle is close to a substation or when another railway vehicle nearby generates energy and supplies it to the energy supply line. In those situations, the railway vehicle could draw more energy from the energy supply line. For safety reasons, the maximum current limitation imposes restrictions on the maximum allowable current to protect the electrical equipment of the railway vehicle.

According to an embodiment, which can be combined with other embodiments described herein, a railway vehicle is provided. The railway vehicle includes a traction motor, a plurality of auxiliary devices, each auxiliary device having a control unit and being an electrical power consumer, a train control and monitoring system having a central control unit operationally connected with the control unit of each of the auxiliary devices, a main power supply to supply electrical energy to the traction motor, and at least one auxiliary power supply to provide electrical energy to at least one of the auxiliary devices. The central control unit is configured to receive information about the amount of electrical current supplied to the traction motor. The central control unit is configured to prioritize operation of the auxiliary devices as a function of the amount of electrical current supplied to the traction motor to reduce consumption of electrical energy by auxiliary devices which are prioritized at a lower level.

Therefore, the railway vehicle is capable of performing the method as described herein.

The terms FIG., FIGS., Figure, and Figures are used interchangeably in the specification to refer to the corresponding figures in the drawings.

BRIEF DESCRIPTION OF THE DRAWINGS

In the following, preferred embodiments are described with reference to the accompanying drawings without limiting the scope as defined by the claims.

The appending drawings illustrate embodiments and serve in combination with the description for explaining the principles of the invention. Elements in the drawings are relative to each other and are not necessary to scale unless otherwise stated.

DESCRIPTION OF THE INVENTION

Figure 1:
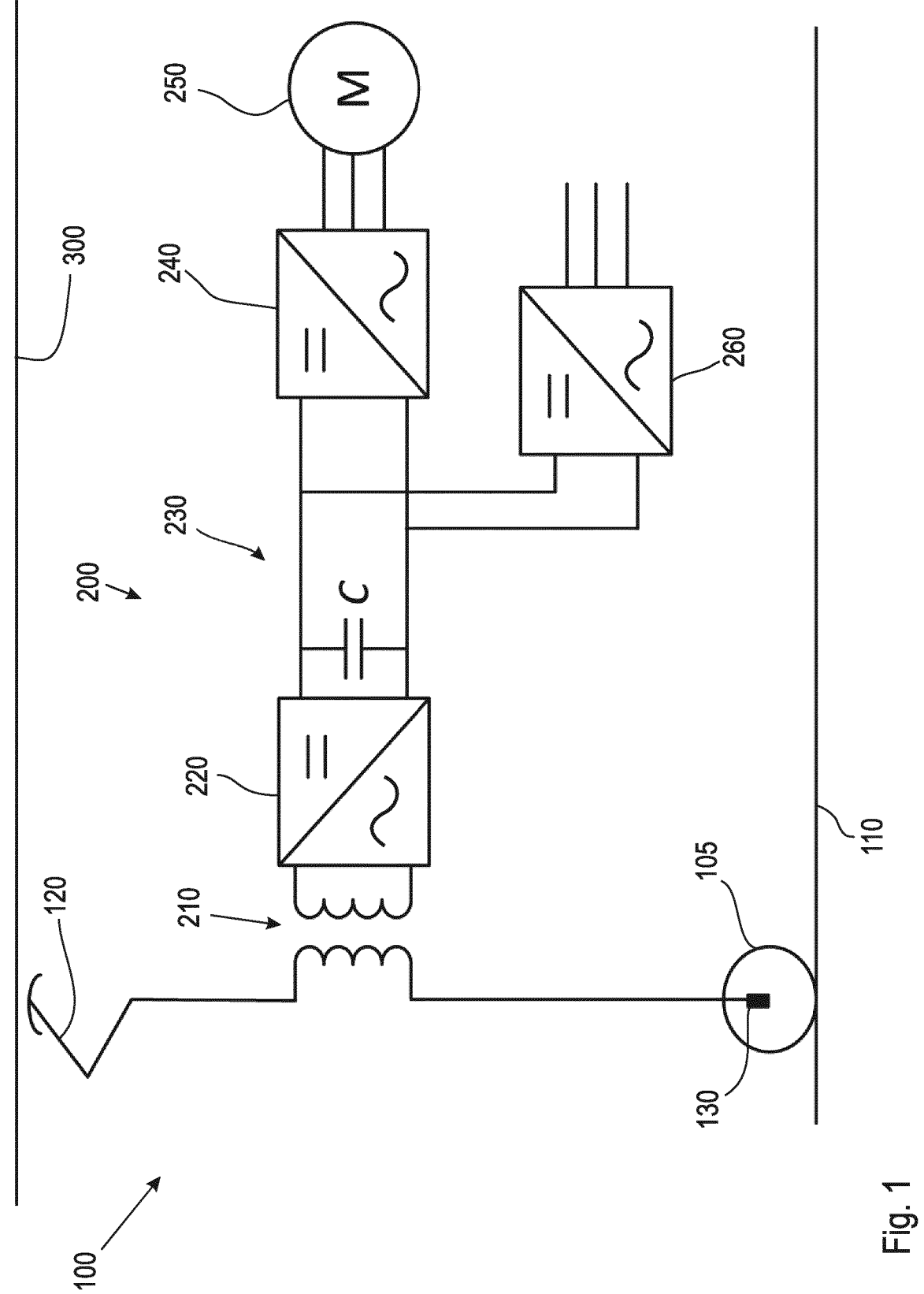
FIG. 1 illustrates a schematic of a railway vehicle according to an embodiment.

FIG. 1 illustrates a railway vehicle 100 according to embodiments described herein. The railway vehicle 100 includes an electrical supply system 200 which receives electrical energy from an energy supply line 300 and converts the electrical energy for the different electrical devices of the railway vehicle 100.

A current collector 120 is in contact with the energy supply line 300 so that the railway vehicle 100 can draw current from the energy supply line 300. The current collector 120 is, in a simplified version of the electrical supply system 200, connected with a main transformer 210. An AC/DC converter 220 is connected with the main transformer 210 to feed an intermediate circuit 230. The main transformer 210 is electrically coupled with a ground contact 130 which provides electrical connection through a wheel 105 to the rail 110 forming ground of the electrical supply system 200.

The electrical supply system 200 of the present embodiment is specific for railway electrification systems operating with alternating current. For DC operating electrification systems an AC/DC converter would not be needed.

In the present embodiment, the energy supply line 300 is embodied by an overhead line which is typically used for long distance European railway networks. Overhead lines may also be used for urban networks. Common alternative energy supply lines for urban networks include third rails which typically runs parallel to the railway tracks. The present invention is not limited to overhead lines and shall comprehend all different types of electrical supply lines.

As shown in FIG. 1, the electrical supply system 200 includes two power supplies 240, 260 which are embodied as DC/AC converters and which are electrically connected with the intermediate circuit 230. Thus, both the traction power supply 240 and the auxiliary power supply 260 are fed by the intermediate circuit 230.

The power supply 240 is a traction power supply providing the needed energy for the traction motor 250. Different thereto, the power supply 260 is an auxiliary power supply providing the needed energy for the various auxiliary devices of the railway vehicle 100.

The traction power supply 240 is typically dimensioned to be able to provide more power than the auxiliary power supply 260 since the traction motor is the main consumer of electrical energy of the railway vehicle 100. The traction power supply 240 is often referred to as traction power unit (TPU) which provides the energy for the dynamic of the train (acceleration, electrodynamic breaking, constant speed).

The auxiliary power supply 260, also referred to as auxiliary power unit (APU), provides the energy to the auxiliary devices such as HVAC, AGTU, lighting, train communication systems, etc.

The HVAC is provided to regulate the internal temperature and humidity of the railway vehicle 100. The HVAC is typically designed so that the desired internal temperature and humidity can be maintained even in extreme situations such as at very high or very low external temperature and high passenger loads. In these extreme situations the HVAC may require maximum power to keep the internal environmental parameters within the pre-set range. In more moderate situations, the feedback control of the HVAC may operate at a given duty cycle as only a moderate output power of the maximum cooling/heating capacity is needed. A typical characteristic regulation time (feed-back time) of an HVAC is 2-3 minutes.

The AGTU provides compressed air which is mainly used for the pneumatic brakes of the railway vehicle but also for doors and other small equipment. The compressed air stored in a vessel is consumed during the pneumatic braking and operating of pneumatic doors, and needs to be replenished at regular intervals. The AGTU is typically oversized so that the volume of compressed air stored in a vessel is not completely exhausted by pneumatic braking and operating of other pneumatic devices after one complete stop of the railway vehicle 100. Typically, the volume of compressed air stored in the vessel may be sufficient for several complete stops so that AGTU is only activated after each 2-3 stop.

The different auxiliary devices may have a pre-set priority depending on their relevance for safe operation of the railway vehicle 100. For example, the AGTU may have a higher priority than the HVAC since the compressed air must be available at all time in case of an emergency braking or opening of the doors in case of an accident.

According to an embodiment, the priority order of the auxiliary devices may be dynamically adapted depending on the current status of the railway vehicle 100. For example, if the vessel containing the compressed air is under high pressure, which means that the maximum amount of compressed air is available, but the internal temperature of the passenger compartment is out of the pre-set range, the priority order of the HVAC and AGTU can temporarily be changed.

The traction motor 250 is the main consumer of the electrical energy and thus usually has the highest priority over any of the auxiliary devices. As the total energy provided by the energy supply line 300 may be limited, the power consumption of the railway vehicle is managed to use the available electrical energy in an efficient manner. For that purpose, the power consumption management is provided at a central high level of the train. Typically, a central control unit 150 of a train control and monitoring system (TCMS) is configured to manage the power consumption of all main electronic devices. TCMS is the highest level controller of the railway vehicle 100 for reliable train control and may include a bus system for communicating with all devices of the railway vehicle 100.

Figure 2A:
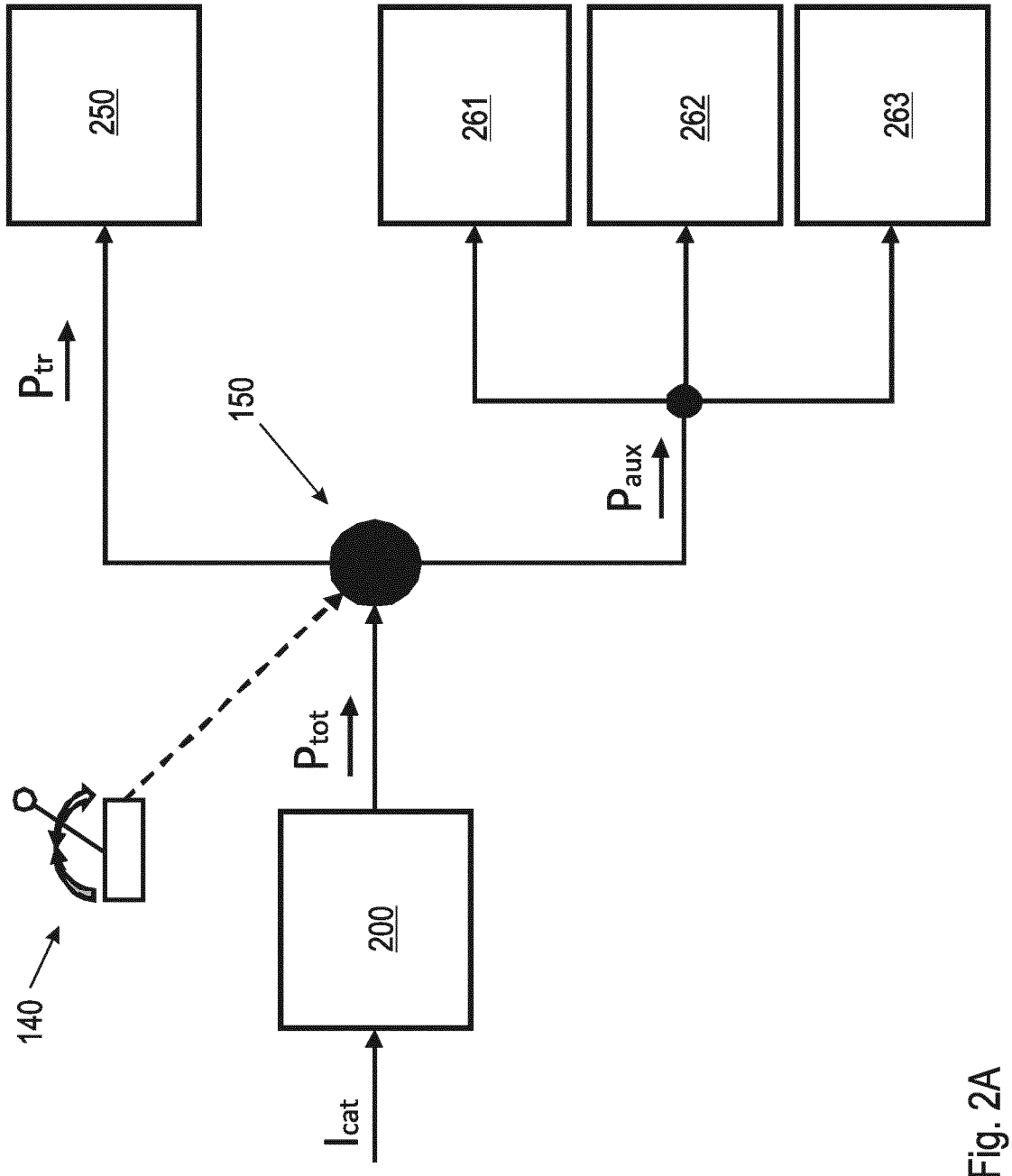
FIGS. 2A and 2B illustrate processes of managing the power consumption of a railway vehicle according to an embodiment.
Figure 2B:
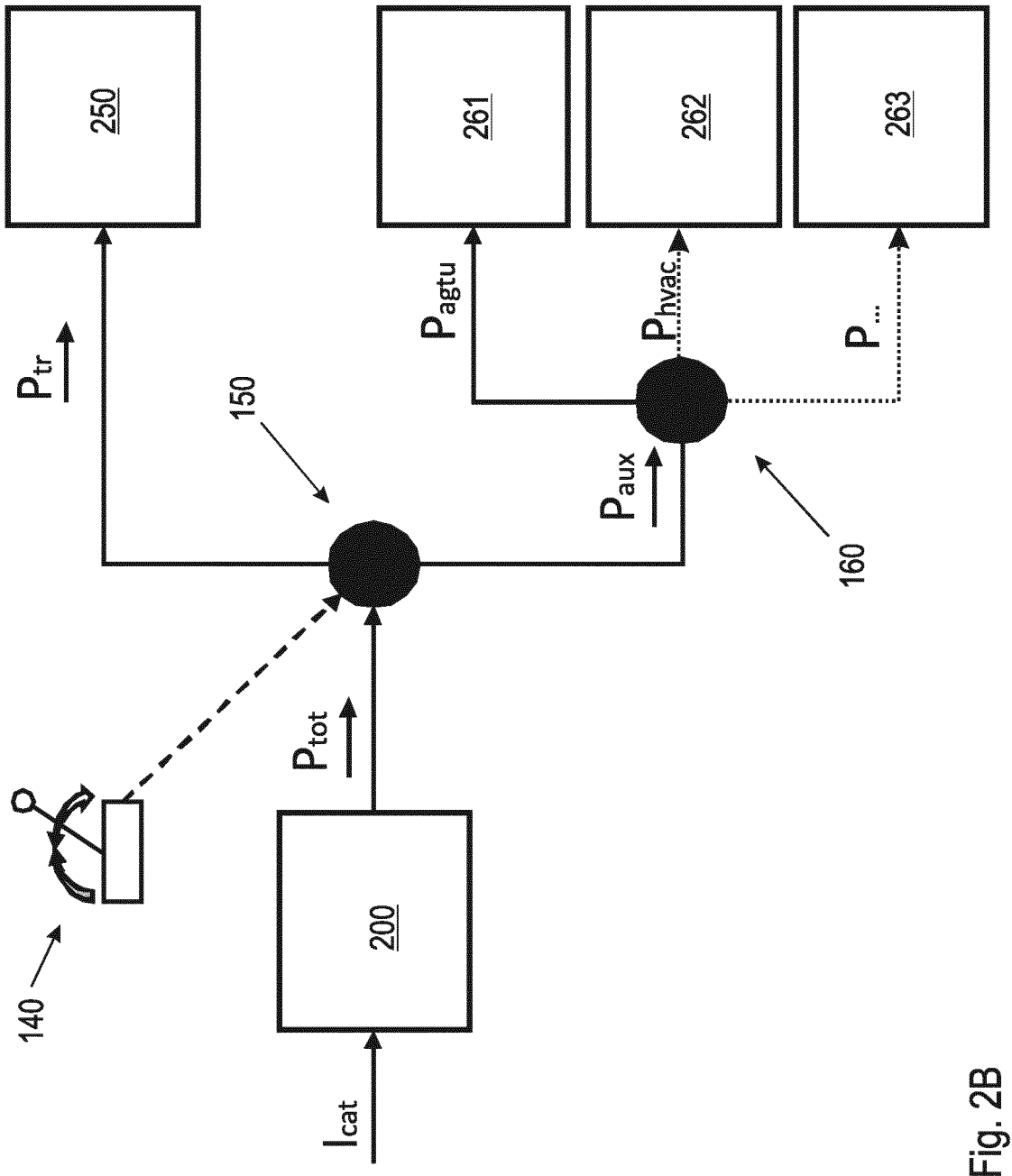

The central control unit 150 is adapted to optimize the energy consumption of the railway vehicle 100 by various means such as prioritising operation of auxiliary devices or selected load shedding to limit the total power consumption of the railway vehicle 100. FIGS. 2A and 2B illustrate the power management according to an embodiment.

Icat denotes the current drawn from the energy supply line 300 to the electrical supply system 200 as described in connection with FIG. 1. The main part of the supplied energy is provided to the traction motor 250. The electrical traction power is denoted by Ptr. The various auxiliary devices 261, 262, 263 demand electrical auxiliary power denoted by Paux. Ptr and Paux add up to the total consumed power Ptot.

The total consumed power Ptot may exceed the total available electrical power which is provided by the energy supply line 300. In such a situation, the central control unit 150 of the train control and monitoring system manages the power consumption of the auxiliary devices 261, 262, 263 depending on their priority. Auxiliary device 261 may be an AGTU. Auxiliary device 262 may represent HVAC while auxiliary device 263 may represent any other device.

The central control unit 150 may receive information regarding the required amount of the electrical traction power Ptr. According to an embodiment, the information is represented by the position of a driver's manipulator 140 for traction and braking. The position of the manipulator 140 may be interpreted as demand for acceleration or deceleration. Only for illustration purposes, if the manipulator 140 is operated to be inclined in a forward direction, this position may indicate strong acceleration corresponding to a high demand for electrical traction power.

The information representing the position of the manipulator 140 may be provided to the central control unit 150 which also receives information on the total available electrical power available from the energy supply line 300. If the demanded electrical traction power, as for example expressed by the position of the manipulator 140, exceeds the currently available total electrical power, the central control unit 150 reduces the power consumption of the auxiliary devices 261, 262, 263 so that nearly all of the available electrical power can be supplied to the traction motor 250. A skilled person will appreciate that not all electrical power will be supplied to the traction motor 250 since at least the train control and monitoring system also mandatorily needs electrical energy for operation. However, auxiliary devices which are not necessarily needed to be operated at any time may be included in the prioritisation of the auxiliary devices.

In addition to the train control monitoring system which needs to be operated at any time, auxiliary devices such as internal and external lights may also be excluded from the power management. Optionally, some auxiliary devices which does not need to be operated at any time but which may be needed for safe operation of the railway vehicle 100 may also be at least temporarily excluded from the central power management.

In addition to the position of the manipulator 140, the change of the position of the manipulator expressed by the derivative in time of the position of the manipulator may also be used for the purposes of the power management as the change of the position of the manipulator (the "speed" in which the manipulator is operated) also provides additional information on future power demands for the traction motor 250.

If the energy supply by the energy supply line 300 is limited, for example due to another train running on the same segment, the voltage of the energy supply line 300 may drop so that also the voltage of the intermediate circuit 230 may be lower. As the electrical power is a product of the voltage×current, the current must be increased to compensate for the voltage reduction to keep the power constant.

In case of power supply limitations of the energy supply line 300, the power consumption of the auxiliary devices will be reduced by the central control unit 150 to "free" additional electrical power which is provided for traction in the railway vehicle 100.

When the voltage Ucat of the energy supply line 300 drops and more electric current Icat is drawn from the energy supply line 300 to compensate for the voltage drop, a situation may arise where the energy supply line 300 would in principle able to provide sufficient electrical energy for traction and all auxiliary devices but where the current Icat to be drawn would exceed an upper limit set to protect the electrical supply system 200. Also in this case, power consumption of the auxiliary devices is reduced in favour of power consumption for traction to avoid that the drawn current Icat exceeds the allowable maximum value.

The central control unit 150 can receive the information regarding temporal limitation of the energy supply by the energy supply line 300 from the wayside over the train control and monitoring system, and/or from a voltage measurement of the voltage appearing between the current collector 120 and the ground contact 130. Thus, the railway vehicle 100 monitors the total available electrical power, which can be provided by the energy supply line 300, and prioritises operation of the auxiliary devices if the railway vehicle 100 requires more electrical power than provided by the energy supply line 300.

Figure 3:
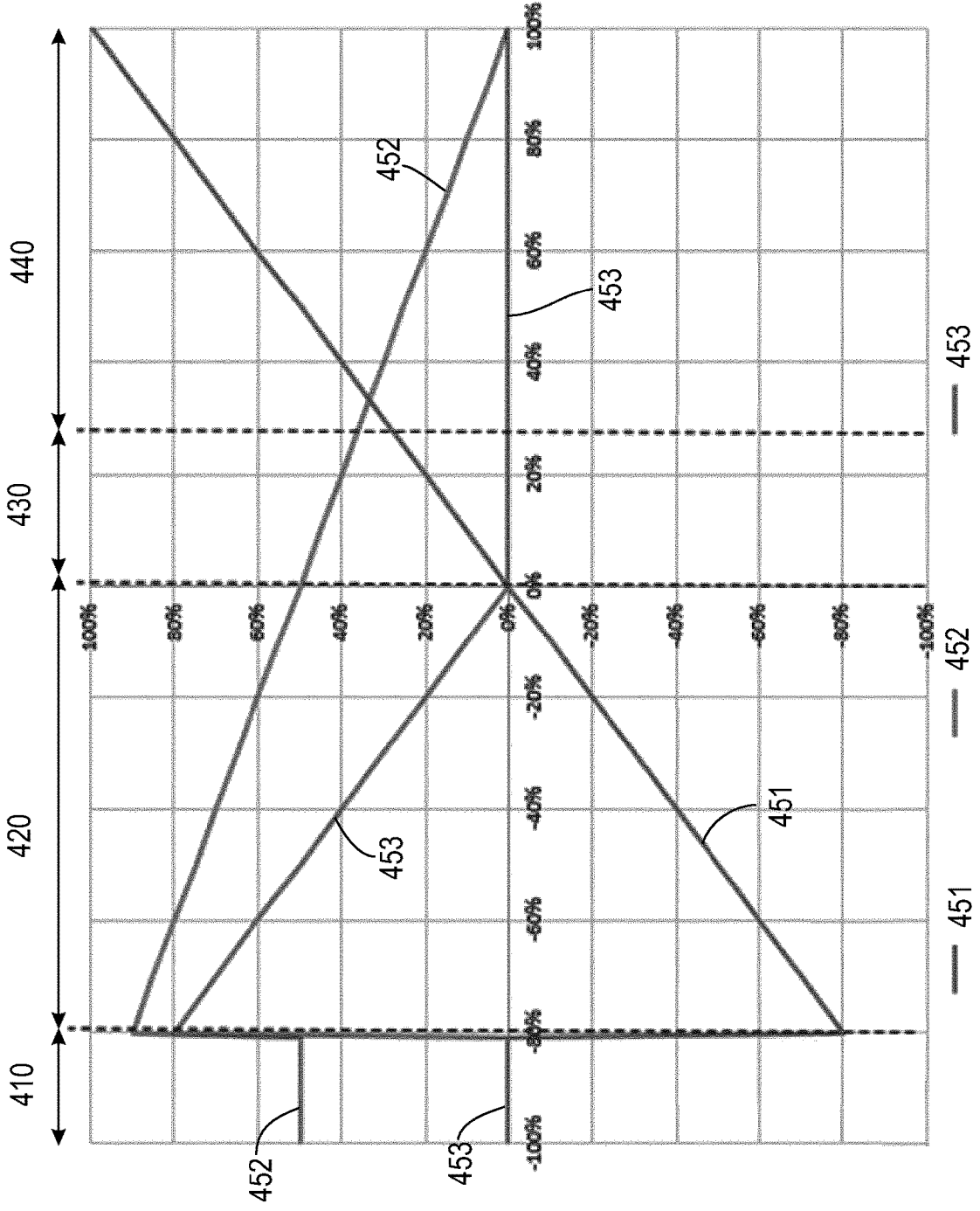
FIG. 3 shows current budget depending on the position of the manipulator.

With reference to FIG. 3 prioritising the power supply is described relative to the dynamic of the railway vehicle 100. The X-axis indicates the position of the manipulator 140 with 100% meaning full traction power and −100% meaning full braking. Region 410 indicates pneumatic braking, region 420 indicates electrodynamic braking, region 430 indicates no traction (coasting or running at constant speed), and region 440 indicates traction. The Y-axis indicates the current budget for the auxiliary devices.

In case that the total power demanded by traction and the auxiliary devices would exceed the total available electrical power provided by the energy supply line 300, the power available for the auxiliary devices would be limited by curve 452. For example, if the demand for the electrical traction power is 60%, only up to 20% of the available power is provided to the auxiliary devices as the remaining 20% would be needed for other devices which cannot be prioritised. Therefore, operation of the HVAC may be temporarily dispensed with to save electrical energy so that traction can be provided with the demanded power.

If the railway vehicle 100 repeatedly accelerates and decelerates as is the case for urban transport systems, the power consumption of the auxiliary devices can also be limited to periods of electrodynamic braking as during these periods the railway vehicle 100 generates electrical energy. Therefore, according to an embodiment, the auxiliary devices are unpowered as long as the railway vehicle 100 is in standstill, acceleration or coasting. The auxiliary devices are only powered when the traction system is generating energy. This is illustrated by curve 453 in FIG. 3. Curve 453 illustrates the optimal current budget for the auxiliary devices so that they only consume electrical energy produced by the railway vehicle 100.

Auxiliary devices may also be operated at given duty cycle to take account of the different dynamic of the railway vehicle. For example, if the railway vehicle is an urban train such as a metro, the HVAC activates the heater for 20 seconds at every 2 minutes between two stops. For energy-saving reasons, it is preferred to activate the heater during electrodynamic braking (region 420) or coasting (region 430).

In case that the auxiliary devices require more energy than provided by electrodynamic braking, the power management operates between curves 452 and 453.

Curve 451 indicates the total current drawn in or generated by the railway vehicle 100. Note that no electrical energy is generated during pneumatic braking.

Safety relevant auxiliary devices such as AGTU might temporarily be excluded from power reduction or maybe rated with a higher priority than other auxiliary devices. In case power available from the energy supply line 300 is limited and a high acceleration is demanded by the driver, low prioritised auxiliary devices may be excluded from power supply while keeping for example the AGTU powered for safety reasons.

Prioritising of the power supply to the auxiliary devices 261, 262, 263 may also include instructing a control unit 160 of the auxiliary power supply 260 for selective power supply to those auxiliary devices which have received a high priority. In the example shown in FIG. 2B, power is only provided to the AGTU 261.

According to an embodiment, the traction current may be monitored in addition to or alternative to the monitoring of the position of the manipulator 140. For example, both the position of the manipulator 140 and the traction current our monitored. If the position of the manipulator demands a high traction power but the actual traction current is lower than needed, this discrepancy may indicate a power supply limitation by the energy supply line 300 triggering the power management as described herein.

Figure 4:
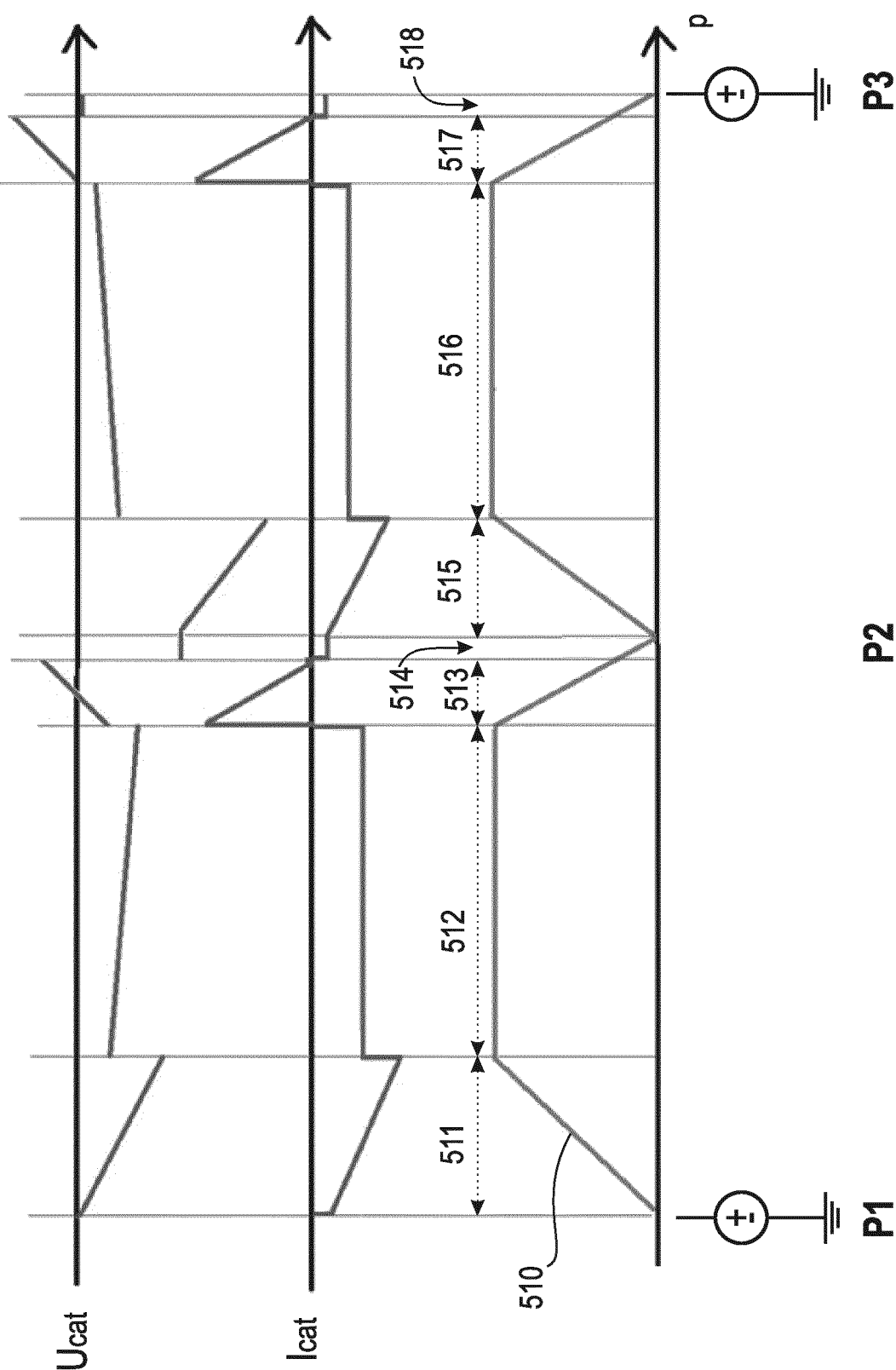
FIG. 4 illustrates the variation of the current and voltage of an energy supply line.
Figure 5:
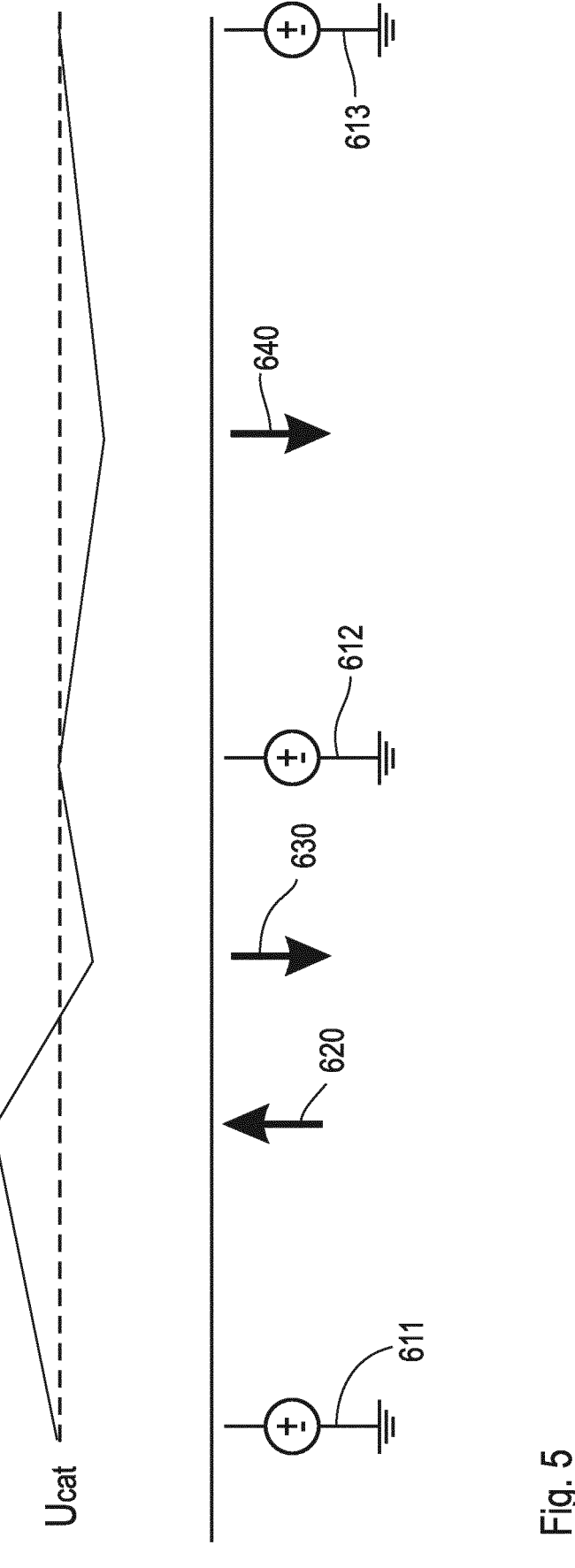
FIG. 5 illustrates the variation of the current and voltage of an energy supply line.

The power management system and method as described herein may also prevent that the voltage of the energy supply line 300 drops below an admissible level. This could occur if the voltage of the energy supply line 300, as appearing at the position of the railway vehicle 100, is already reduced, for example due to ohmic losses in the energy supply line 300. If the traction requires a certain electrical power to achieve a pre-set acceleration demanded by the driver, the voltage would be further lowered due to the higher current flowing through the energy supply line 300. This is indicated, for example, in section 515 of FIG. 4. If the thus generated additional voltage drop would decrease the voltage of the energy supply line 300 below the admissible level, the railway vehicle 100 may forcibly be stopped for safety reasons. The risk may further increase if additional auxiliary devices would be powered on during this period. Limiting the power consumption of auxiliary devices during periods of high demand for electrical traction power and limited total available electrical power for the railway vehicle may prevent that the railway vehicle is stopped due to safety reasons. Therefore, the safety of the operation of the railway vehicle 100 can be improved.

Although specific embodiments are illustrated and described herein, the skilled person will appreciate that the embodiments can be modified without departing from the scope as defined by the claims.

LIST OF REFERENCE NUMBERS

100 railway vehicle
105 wheel
110 rail
120 current collector
130 ground contact
140 manipulator
150 central control unit of train control and monitoring system
160 control unit of auxiliary power supply
200 electrical supply system
210 main transformer
220 AC/DC converter
230 intermediate circuit
240 traction power supply (DC/AC converter)
250 traction motor
260 auxiliary power supply (DC/AC converter)
261, 262, 263 auxiliary device
300 energy supply line
410 pneumatic braking
420 electrodynamic braking
430 coasting
440 traction
451 total current
452 maximum available current budget for auxiliary devices
453 optimal current budget
510 velocity
511, 515 section (acceleration)
512, 516 section (constant speed)
513, 517 section (electrodynamic braking)
514, 518 section (pneumatic braking)
611, 612, 613 substation
620, 630, 640 railway vehicle
P1, P2, P3 location

The invention claimed is:

1. A method for managing power consumption of a railway vehicle receiving electrical energy from an energy supply line comprising an overhead line or a rail for supplying the electrical energy to the railway vehicle from at least one substation, the railway vehicle having at least one traction motor, a plurality of auxiliary devices, each auxiliary device having a control unit and being an electrical power consumer, and a train control and monitoring system (TCMS) having a central control unit operationally connected with the control unit of each of the auxiliary devices, the method comprising:

receiving, by the central control unit, information representing an amount of electrical traction power required for traction or generated by electrodynamic braking of the railway vehicle by the at least one traction motor based on a traction demand set by a driver of the railway vehicle;

receiving, by the central control unit, information representing an amount of electrical auxiliary power demanded by auxiliary devices from the control units of the respective auxiliary devices;

determining the total available electrical power for the railway vehicle which can be provided by the energy supply line, wherein determining the total available electrical power comprises receiving information, representing the total available electrical power, from a wayside by the train control and monitoring system; and prioritizing, by the central control unit, operation of the auxiliary devices based on the total available electrical power and the electrical traction power required for traction to selectively reduce consumption of electrical energy by all or selected auxiliary devices if a sum of the electrical traction power required for traction and the electrical auxiliary power demanded by auxiliary devices exceeds the total available electrical power supplied by the energy supply line.

2. The method according to claim 1, wherein the information about the amount of electrical traction power required for traction of the railway vehicle is obtained by monitoring a position and/or a derivate in time of the position of a manipulator operated by the driver of the railway vehicle to accelerate and decelerate the railway vehicle.

3. The method according to claim 1, wherein prioritizing operation of the auxiliary devices comprises sending instructions to the control unit of the respective auxiliary device for load shedding.

4. The method according to claim 1, wherein the railway vehicle further comprises an auxiliary power supply for supplying at least one of the auxiliary devices with electrical energy, the auxiliary power supply comprising a control unit operationally connected with the central control unit of the train control and monitoring system, and wherein prioritizing operation of the auxiliary devices includes sending instructions to the control unit of the auxiliary power supply to reduce the power output of the auxiliary power supply to the at least one auxiliary device.

5. The method according to claim 1, wherein the information about the amount of electrical traction power required for traction of the railway vehicle is obtained by monitoring a position and/or a derivate in time of the position of a manipulator operated by the driver of the railway vehicle to accelerate and decelerate the railway vehicle, and wherein the railway vehicle further comprises an auxiliary power supply for supplying at least one of the auxiliary devices with electrical energy, the auxiliary power supply comprising a control unit operationally connected with the central control unit of the train control and monitoring system, and wherein prioritizing operation of the auxiliary devices includes sending instructions to the control unit of the auxiliary power supply to reduce the power output of the auxiliary power supply to the at least one auxiliary device.

6. The method according to claim 1, wherein determining the total available electrical power comprises determining a maximum current limitation pre-set for the railway vehicle.

7. A railway vehicle comprising a traction motor, a plurality of auxiliary devices, each auxiliary device having a control unit and being an electrical power consumer, a train control and monitoring system comprising a central control unit operationally connected with the control unit of each of the auxiliary devices, a main power supply to supply electrical energy from an energy supply line, comprising an overhead line or a rail, to the traction motor from at least one substation, and at least one auxiliary power supply to provide electrical energy to at least one of the auxiliary devices, wherein:

the central control unit is configured to receive information about an amount of electrical current supplied to the traction motor from the energy supply line based on a traction demand set by a driver of the railway vehicle;

the central control unit is configured to determine the total available electrical power for the railway vehicle which can be provided by the energy supply line, wherein determining the total available electrical power comprises receiving information, representing the total available electrical power, from a wayside by the train control and monitoring system; and the central control unit is configured to prioritize operation of the auxiliary devices as a function of the amount of electrical current supplied to the traction motor from the energy supply line to reduce consumption of electrical energy by auxiliary devices which are prioritized at a lower level, if a sum of the electrical traction power required for traction and the electrical auxiliary power demanded by auxiliary devices exceeds the total available electrical power provided by the energy supply line.

8. A railway vehicle according to claim 7, further comprising a manipulator operated by the driver of the railway vehicle to accelerate and decelerate the railway vehicle, wherein the information about the amount of electrical traction power required for traction of the railway vehicle is obtained by monitoring a position and/or a derivate in time of the position of the manipulator.

* * * * *